United States Patent [19]
De Andrade

[11] Patent Number: 5,909,780
[45] Date of Patent: Jun. 8, 1999

[54] VEHICLE FOR UNDERGROUND MINE SHAFTS

[75] Inventor: John De Andrade, Karrabin, Australia

[73] Assignee: Ani Mining Services Ltd, Queensland, Australia

[21] Appl. No.: 08/793,818

[22] PCT Filed: Aug. 17, 1995

[86] PCT No.: PCT/AU95/00511

§ 371 Date: Feb. 18, 1997

§ 102(e) Date: Feb. 18, 1997

[87] PCT Pub. No.: WO96/05996

PCT Pub. Date: Feb. 29, 1996

[30] Foreign Application Priority Data

Aug. 22, 1994 [AU] Australia .................................... 7581
Aug. 22, 1994 [AU] Australia .................................... 7582
Aug. 22, 1994 [AU] Australia .................................... 7583

[51] Int. Cl.$^6$ .................................................. B62D 55/00
[52] U.S. Cl. ........................ 180/9.58; 180/294; 180/6.48
[58] Field of Search ...................... 180/9.1, 9.58, 180/9.6, 78, 294, 295, 299, 6.2, 6.3, 6.48; 303/6.1; 296/1.1, 24.1, 178, 183, 63, 64; 280/124.13, 124.131, 124.137, 305, 307

[56] References Cited

U.S. PATENT DOCUMENTS

| | | | |
|---|---|---|---|
| 1,836,446 | 12/1931 | Christie | 180/9.1 |
| 2,713,484 | 7/1955 | Pierce | 280/124.137 |
| 2,724,451 | 11/1955 | Prather | 303/6.1 |
| 3,157,394 | 11/1964 | Kelley | 180/9.1 |
| 3,262,522 | 7/1966 | Johnson et al. | 180/9.1 |
| 3,504,930 | 4/1970 | Kozowyk et al. | 280/124.137 |
| 3,893,697 | 7/1975 | Blitz et al. | 303/6.1 |
| 4,037,677 | 7/1977 | Koch | 180/6.7 |
| 4,043,417 | 8/1977 | Orpana | 180/9.54 |
| 4,062,582 | 12/1977 | Youmans | 296/28 C |
| 4,090,578 | 5/1978 | Shinoda et al. | 180/52 |
| 4,194,761 | 3/1980 | Falk et al. | 280/705 |
| 4,392,545 | 7/1983 | Harasaki et al. | 180/294 |
| 4,541,301 | 9/1985 | Ono et al. | 180/78 |
| 4,687,071 | 8/1987 | Hartz et al. | 180/9.1 |
| 4,796,721 | 1/1989 | Knapp et al. | 180/294 |
| 4,966,386 | 10/1990 | Werdich | 280/124.137 |
| 5,263,901 | 11/1993 | Kawakami et al. | 180/6.48 |

FOREIGN PATENT DOCUMENTS

| | | |
|---|---|---|
| 1003891 | 7/1992 | Belgium . |
| 1 223 913 | 7/1987 | Canada . |
| 2 377 923 | 8/1978 | France . |
| 25 59 146 | 7/1976 | Germany . |
| 2 047 643 | 12/1980 | United Kingdom . |

*Primary Examiner*—Kevin Hurley
*Attorney, Agent, or Firm*—Fish & Richardson P.C.

[57] ABSTRACT

A vehicle for underground mine shafts includes a body having a cabin located in a front section of a vehicle with an entry to the cabin located at the front of the vehicle, a door at the entry, a sensor for sensing when the door is open and control circuitry which is connected to the sensor. The vehicle also includes vehicle brakes to activate the vehicle brakes when the sensor senses that the door is open, a pair of tracks on either side of the cabin, a driving means for driving the tracks, a steering means for steering the body, and a suspension system including a torsion bar suspension arrangement which permits torsion bars of the vehicle to be located just above the level of track wheels of the vehicle. The torsion bar suspension arrangement has a torsion bar receiving means for applying torsion to the torsion bars and the torsion adjusting means includes engagement means being capable of orientation at a predetermined angle with respect to a vertical axis for engaging the torsion bar receiving means and a member having a channel formed therein for receipt of the engagement means. The torsion adjusting means is arranged to urge the torsion bar receiving means to a predetermined orientation.

20 Claims, 14 Drawing Sheets

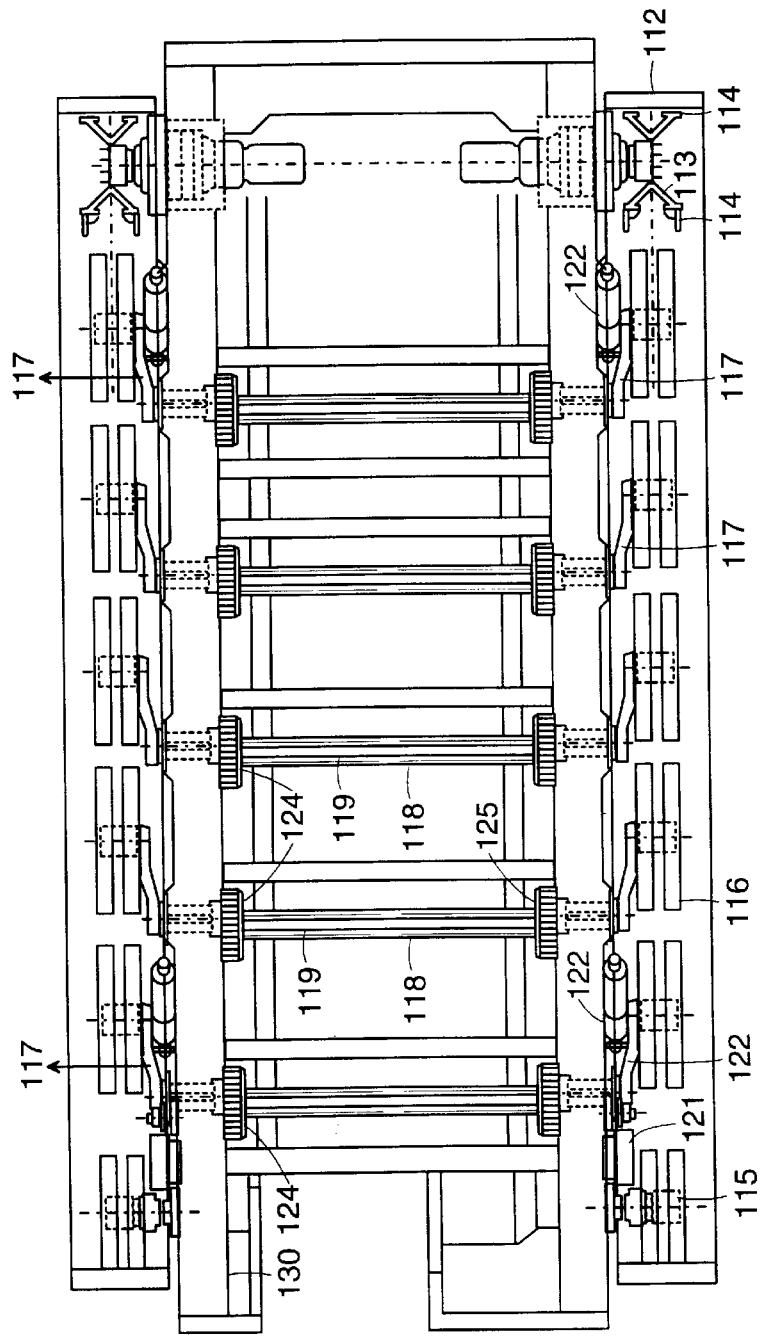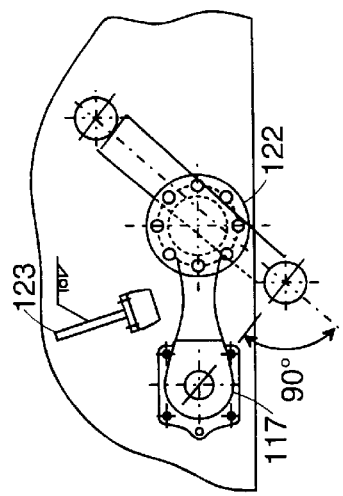
FIG. 7
FIG. 8

VEHICLE FOR UNDERGROUND MINE SHAFTS

TECHNICAL FIELD

The present invention is concerned with tracked vehicles and, more particularly, with tracked vehicles adapted for use in underground mines.

BACKGROUND ART

Underground mining is a common way of extracting minerals such as coal. In this type of mining considerable amounts of unproductive paid time are expended in transporting mine workers from the surface facilities of the mine to the underground coal face. Travel to and from the coal face in traditional wheeled vehicles is both slow and uncomfortable as the underground roadways traversed are often very rough and at times slope steeply. The underground roadways may consist of clay, sharp shale or crushed ore. They are frequently extremely wet or muddy, and may have a substantial cross-grade.

It will be appreciated in these circumstances that the transportation of mine workers to the coal face in wheeled personnel vehicles is not only slow, it may also result in injuries, such as back injuries, to the workers. The Workers Compensation costs associated with such injuries are large, as is the cost of unproductive time when the mine workers are in transit to the coal face.

Furthermore, the enclosed nature of an underground mine means that hazards and/or discomfort are experienced when toxic and/or noxious gases are emitted by machinery operating in the mine. As diesel engines produce noxious and toxic gases and underground personnel vehicles are conventionally configured with a rearward facing entry positioned just above or behind an exhaust outlet from a diesel engine, a hazard can arise where the exhaust gases are not immediately dispersed. Also, a vehicle travelling over a loose surface produces a good deal of dust which is sucked into the rear of the vehicle. Thus, in an underground mine it is possible that engine exhaust gases and airborne dust will build up in the vicinity of the rearward facing entry and possibly enter the cabin. While this generally is only inconvenient for the personnel in the cabin (as the exhaust gases are noxious and dust is irritating), if toxic gases are carried into the cabin in high enough concentrations a health hazard may exist.

A common configuration for a track in a tracked vehicle is one in which the track is driven by a sprocket. Typically a sprocket will be located at the front and/or rear of the track inside the track and a plurality of road wheels will be located within the loop of the track. The road wheels are typically mounted on trailing road wheel arms which are in turn mounted on torsion bars which pass laterally through the vehicle to provide independent suspension for each of the road wheels.

It is desirable for a tracked vehicle working in an underground mine to have a relatively low ground clearance so as to minimise the height of the vehicle. This allows the vehicle to operate in areas where the roof is low. However, where very rough surfaces are traversed a greater ground clearance is desirable to ensure that large objects on the ground pass underneath the vehicle.

DISCLOSURE OF THE INVENTION

The present invention provides a way of transporting personnel in a mine more quickly and in greater safety and comfort.

According to a first aspect of the first invention there is provided a method of transporting personnel in a mine comprising the steps of:

(1) loading said personnel into a tracked vehicle (2) driving said tracked vehicle within said mine; and (3) unloading said personnel from said tracked vehicle.

According to a second aspect of the first invention there is provided the use of a tracked vehicle in a mine to transport personnel.

It will be appreciated that all references throughout the specification to "personnel" also include equipment where such equipment is transportable or likely to be transported.

Preferably, the mine is an underground mine such as an underground coal mine. In this case personnel will generally be transported along an underground roadway from the surface to a point where mining operations are being conducted or vice versa.

According to a third aspect of the first invention there is provided a tracked vehicle adapted for use in an underground mine comprising:

1a cabin in which personnel are carried;

(2) a pair of tracks disposed one to each side of the cabin and supporting the cabin;

(3) drive means for independently driving each one of said tracks, steering being effected by driving said tracks at different rates; and (4) control means operable by a driver to control said drive means;

wherein said vehicle is a suitable size and shape to negotiate a roadway in an underground mine.

Typically, the cabin is long and low and located in the front portion of the vehicle. The tracks generally do not protrude beyond the vehicle. The vehicle is generally 5.66 m long, 2.65 m wide and 1.5 m high (adjustable to a maximum of 1.85 m in a preferred embodiment) with a ground clearance of 0.3 m (adjustable to 0.65 m), and can carry 12 passengers and a driver.

Advantageously, the drive means is located behind the cabin in an enclosure which extends from the cabin and is the same width as the cabin. The drive means typically comprises a diesel engine, a hydraulic pump which is driven by the diesel engine, a hydraulic motor which is driven by the hydraulic pump and a torque hub which transfers drive from the hydraulic motor to the tracks. Alternatively, mechanical or electrical transfers may impart motive power to the tracks and petrol-driven or electric motors may also be used.

It is desirable for the diesel engine, its cooling system and the hydraulic pump to comprise a module which may be lifted out of the engine bay as a whole. In the event of a breakdown in the drive means, a replacement module may then be secured in the engine bay to allow the vehicle to continue in use with little delay.

Advantageously, said module is bolted to the vehicle body at one or more points and a rubber block is interspersed between the module and the vehicle body to isolate the engine and prevent engine vibrations affecting the passenger cabin. Typically the module is attached at four points.

Preferably, an electronic control system is provided whereby the driver controls the drive means from a location in the front of the vehicle. The electronic control system allows the driver controls to be presented in the format generally found in automotive applications. The controls preferably include a forward/neutral/reverse selector, an accelerator pedal, a retard brake pedal, a park brake and a steering wheel. The electronic control system protects the diesel engine from laboring or stalling by sensing the engine revolutions and depowering the hydraulic pumps when grades or loads vary.

According to a fourth aspect of the invention there is provided a tracked vehicle which is arranged so that access to the vehicle is gained by way of an entry which is spaced apart from any source of airborne matter or exhaust gas produced by the vehicle. Typically the tracked vehicle is for use in underground mines.

Preferably, the entry is provided at the front of the vehicle. The exhaust outlet may then be located at the rear of the vehicle where most of the dust raised by the moving vehicle will accumulate. The entry is generally an open doorway but may be closed by a door if so desired.

Preferably, a driver's compartment is provided at one side of the front of the tracked vehicle, and the doorway is on the other side of the vehicle and provides access to the cabin which extends across the vehicle behind the driver's compartment.

More preferably, a step is provided in front of the doorway and access to the step can be prevented by a door.

In a preferred embodiment of the invention the vehicle comprises a driver's compartment at one side of the front of the vehicle; a step, optionally closed by a door, on the other side of the front of the vehicle, a passageway extending from said step into a passenger compartment which spans substantially the full width of the vehicle and extends behind the driver's compartment, and an engine compartment to the rear of the vehicle which houses the drive means and is separated from the passenger compartment by a partition.

Advantageously, fuel and water tanks are located in one side wall of the vehicle.

An air receiver for starting the diesel engine by compressed air is conveniently located in the other wall together with the hydraulic oil tank and ancillary equipment such as an electrical junction box, etc.

Advantageously, an exhaust scrubber is provided for the diesel engine to prevent any sparks in the exhaust gases reaching the exhaust outlet.

According to a fifth aspect of the present invention there is provided a torsion adjustment mechanism for a torsion bar suspension comprising torsion bar receiving means for applying torsion to a torsion bar and torsion adjusting means which urge said torsion bar receiving means to a predetermined orientation.

Advantageously, the torsion adjusting means is attached to support means in a predetermined position.

The support means can be a bracket for attachment to the body or chassis of a vehicle.

Preferably, the torsion adjusting means includes engagement means for engaging the torsion bar receiving means.

In order to urge the torsion bar receiving means to said predetermined orientation, the engagement means can be orientated at a predetermined angle from the vertical.

In a preferred embodiment of the invention, the torsion adjusting means is a block having a channel formed therein, said channel constituting the engagement means.

The channel can receive an elongated member extending from the torsion bar receiving means.

Preferably, the torsion bar receiving means is an internally splined boss with an arm extending therefrom.

The arm is adapted to be received in the channel in the block. A thumb screw arrangement or other securing means can be used to hold the arm firmly in the channel.

The block can be welded to the support means or directly onto the chassis of the vehicle in a predetermined position in which the channel is orientated at said predetermined angle to the vertical. In this case, the arm will also be held at that angle.

Advantageously, the boss is retained in an orifice in a retainer plate but can rotate so that the arm can be received in the channel.

The tendency to rotation induced by the arm engaging the channel determines the torsion applied to the torsion bar. This in turn determines the amount of suspension "give" when the weight of the vehicle is taken and so determines the ground clearance of the vehicle.

According to another aspect of the present invention there is provided a ground clearance adjustment mechanism for a vehicle having a torsion bar suspension, the ground clearance adjustment mechanism comprising a plurality of torsion bars extending laterally through the vehicle and a torsion adjustment mechanism as described above for adjusting the torsion applied to each said torsion bar.

Typically the vehicle is a tracked vehicle.

In a tracked vehicle having a plurality of road wheels, each road wheel is mounted on a trailing road wheel arm which is in turn mounted on one said torsion bar.

By adjusting the torsion applied to each torsion bar the vehicle can be made to sit higher or lower on the suspension thus the ground clearance can be raised or lowered.

In a preferred form of the invention the torsion applied is determined during manufacture of the vehicle, for example, by welding the block to the bracket at a particular angle, and this is set to suit the conditions in which the vehicle will be used.

By way of example, a ground clearance of 300 mm will often be suitable but where the roof in a mine is sufficiently high and the floor of the underground roadways is very rough the clearance could be set at 500 mm or 600 mm.

In order to achieve the lowest possible ground clearance it is preferred that the trailing road wheel arms are disposed horizontally and extend substantially transversely from the torsion bar in each case.

Generally, in a tracked vehicle each road wheel will bear a different weight. For example, to the rear of the vehicle the suspension must support the engine and so bears a large weight while the front of the vehicle bears relatively little weight. Adjustment of the torsion applied to the rear torsion bar, for example by welding the block so that the channel is 20° from the vertical instead of 5° from the vertical as at the front, allows the engine to be supported and the vehicle to sit evenly with uniform ground clearance.

As an alternative, the torsion adjustment mechanism can be adapted to allow adjustment of the torsion while the vehicle is in the field, for example, by making the position of the block moveable by an adjustment that can be made in the field.

According to a further aspect of the invention there is provided a boss member comprising an internally splined boss portion for applying torsion to a splined end of a torsion bar and an arm portion adapted to be received in a channel formed in a block, said channel being orientated at an angle such that engagement of said arm portion in the channel urges the boss portion to rotate.

According to the present invention there is provided a steering assembly comprising a shaft, a steering wheel mounted on the shaft for imparting rotational motion to said shaft, and biasing means for biasing said shaft to a predetermined position.

Preferably, said biasing means is coupled to the shaft.

Advantageously, said biasing means is coupled to the shaft at more than one point. The action of said biasing means through each of the points of connection can be additive.

Preferably, said biasing means acts to centre the shaft. In this case, when the steering wheel is turned from the central position resistance will be felt and the wheel will return to the central position once released. In a vehicle, the central position will correspond to steering the vehicle in a straight forward or reverse direction.

In a preferred embodiment of the invention bias is provided by a spring, preferably a coil spring Advantageously, each spring is connected to the shaft by substantially inextensible link means such as plurality of interconnected chain links. The chain may extend around one or more pulleys if so desired.

A particularly preferred arrangement has two chains extending from the shaft at 180° to each other and each turning through 180° and being laterally displaced by a pulley before connecting with an anchored coil spring.

According to another aspect of the present invention there is provided a steering arrangement for a vehicle comprising an shaft, a steering wheel mounted on the shaft for imparting rotational motion to said shaft, biasing means for biasing said shaft to a predetermined position, means for measuring rotation of said shaft and means for steering the vehicle in proportion to the rotation of said shaft.

Preferably, the vehicle is a tracked vehicle and steering is effected by selective application of power to the tracks.

The application of power to the tracks can be controlled by an electrical circuit which controls the displacement of a hydraulic pump associated with each track. The hydraulic pump drives a hydraulic motor which in turn drives a sprocket which rotates the track.

Advantageously, the rotation of the shaft is measured by a potentiometer.

The potentiometer generally includes a wiper which offsets a bridge circuit when said shaft rotates which generates a current in a steer circuit which is proportional to the degree of rotation of said shaft.

The steer current may then be added to or subtracted from a current in a propel circuit, which controls the speed of the vehicle, to increase or reduce the displacement of the hydraulic pump. Increasing the displacement of one pump whilst reducing the displacement of the other steers the vehicle.

BRIEF DESCRIPTION OF DRAWINGS

Preferred embodiments of the invention will now be described by way of example only with reference to the accompanying drawings in which:

FIG. 7 is a cross-section through the vehicle shown in FIG. 1 along line 2—2;

FIG. 8 is a side view of the wheel mounting arrangement in the vehicle shown in FIG. 1;

BEST MODES FOR CARRYING OUT THE INVENTION

The vehicle illustrated in the Figures is specifically designed for transporting workers to and from a centre of operation in a mine, such as a coal face, and is designed to be able to operate at constant speed over rough ore floors at relatively high speeds. If the mine roadway is level the vehicle can travel at 25 km per hour, if there is 1 in 15 grade at 20 km per hour, if there is a 1 in 8 grade at 10 km per hour and a 1 in 4 grade at 4 km per hour. The vehicle may also operate safely on cross grades of up to 1 in 8. The vehicle is capable of operating on sharp shale and crushed ore surfaces, on extremely wet and muddy roadways, and through up to 300 mm of water without water entering the vehicle. The tracked vehicle will significantly reduce the risk of back injury to passengers by bridging potholes in the roadway, unlike traditional personnel vehicles which transmit the shock of each wheel encountering such a depression to the passengers. Bumps or depressions or combinations of both which are 200 mm or higher can be negotiated at speeds of up to 10 km per hour and a 1m wide trench can be straddled by the vehicle with slight reduction of speed for safety. The vehicle may negotiate a 180 mm depth change (canche) but speed should be reduced to around 7 km per hour. Where corrugations up to 80mm in height are encountered normal speed may also be maintained. Where rocks and scattered debris up to 150 mm in height are encountered normal speed may be maintained with caution.

Figure 1:
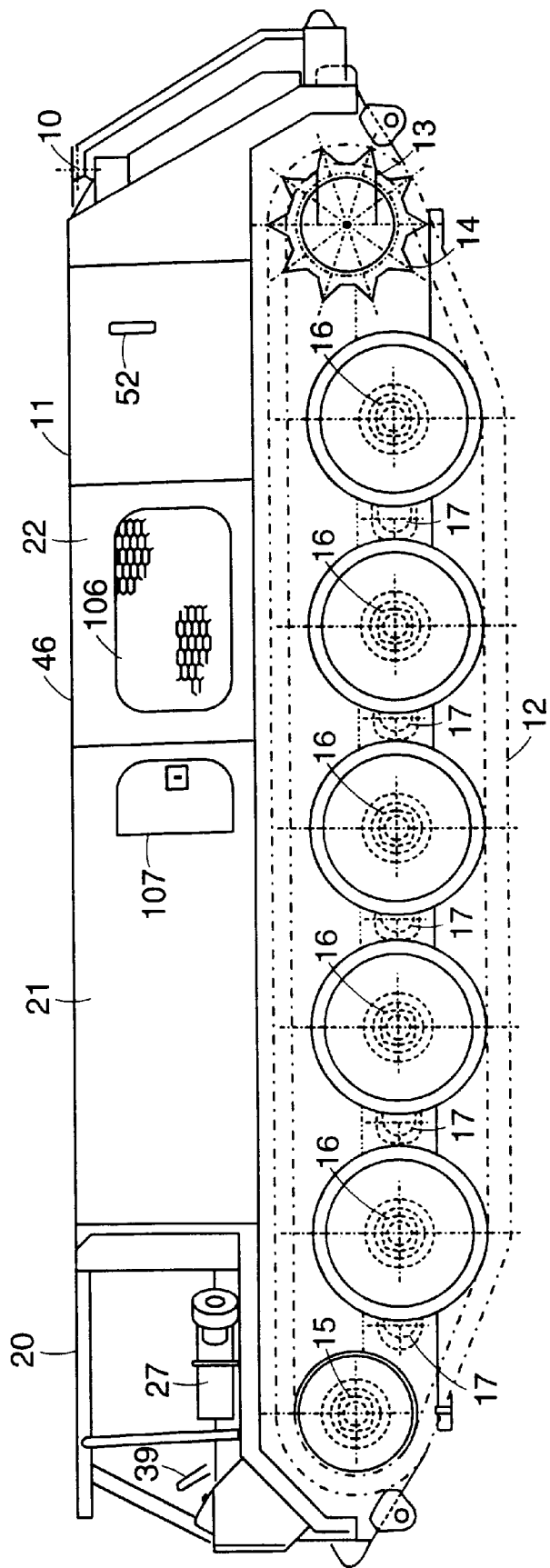
FIG. 1 is side view of a tracked vehicle for use in underground mines.
Figure 2:
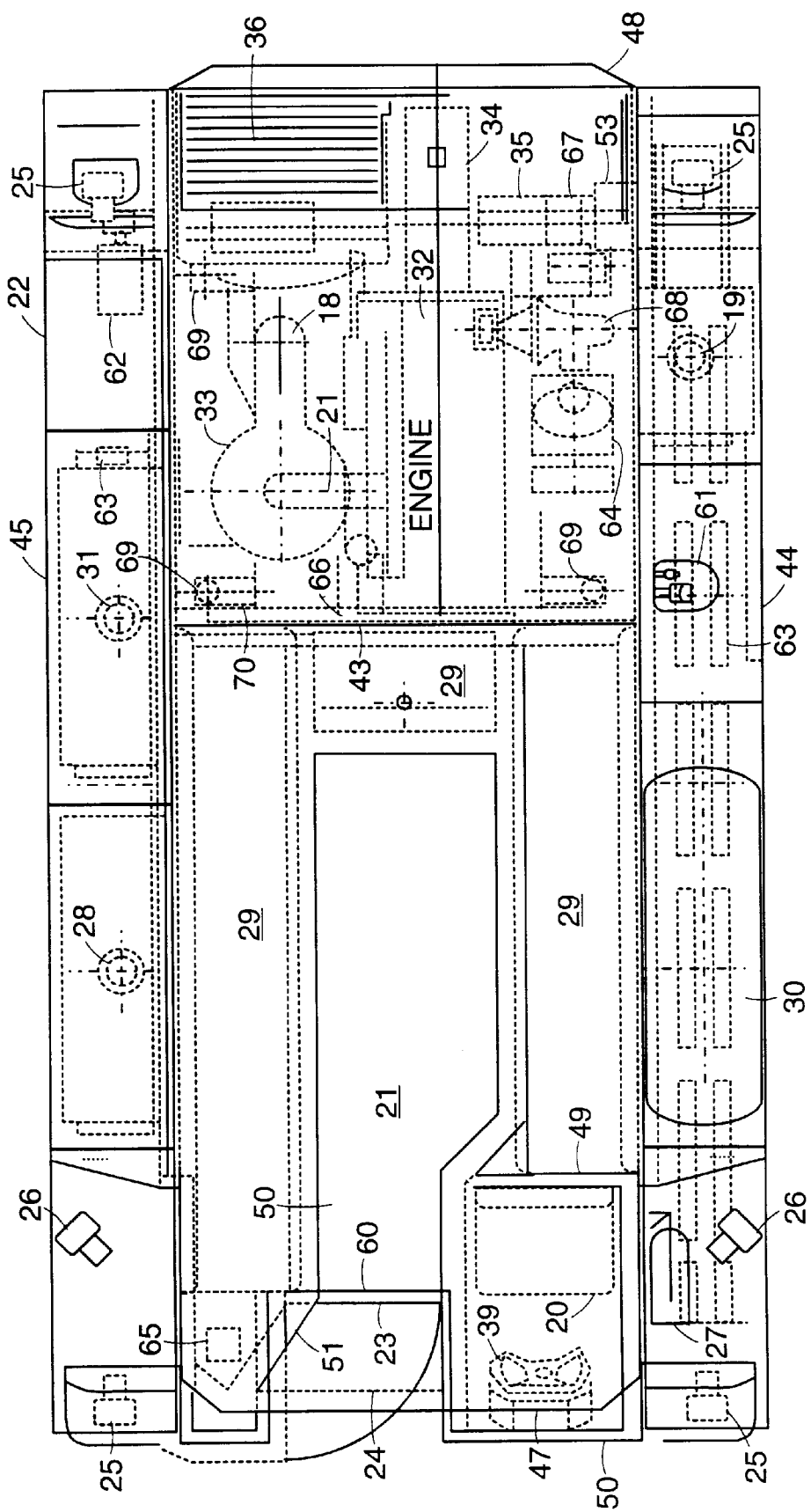
FIG. 2 is a plan view of the vehicle shown in FIG. 1.

Referring now to FIGS. 1 and 2, the vehicle 10 is seen to comprise a body 11 mounted on tracks 12, only one of which is seen in the side view. A track 12 is driven by track drive sprocket 13 positioned towards the rear of the vehicle 10. Each track drive sprocket 13 is rotated by a torque hub 53 driven by a hydraulic motor 35 (best seen in FIG. 2) to which pressurised hydraulic fluid is provided from the hydraulic pump 34, which is in turn powered by a diesel engine 32 located inside the vehicle body towards the rear of the vehicle. The teeth 14 of track drive sprocket 13 propel the vehicle when track drive sprocket 13 is rotated with the teeth engaging and disengaging with gaps between the links of the track 12.

During propulsion, the track 12 turns about forward guide wheel 15 which maintains track tension and returns to drive sprocket 13. Five road wheels 16 are located between forward guide wheel 15 and track drive sprocket 13. Each road wheel 16 is mounted on a trailing road wheel arm 17 which is in turn mounted by a bearing to the body 10 and connected to a torsion bar (not shown) which extends the width of the vehicle to provide independent suspension for each road wheel. A corresponding number of road wheels 16 and road wheel arms 17 are similarly mounted on the other side of the vehicle.

Figure 3:
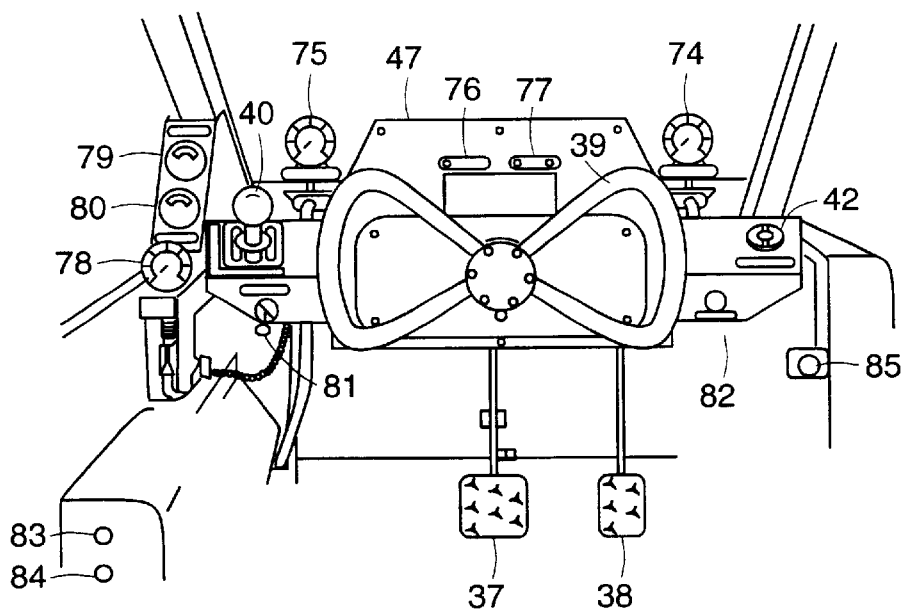
FIGS. 3 and 4 show the layout of the driver's compartment in the vehicle shown in FIG. 1.

Referring to FIGS. 7 and 8 it will also be noted that a shock absorber 122 is secured to the front and rear road wheels 116. The shock absorber 122 comprises a cylinder with a piston slidably mounted therein and contains oil. When the wheels hit a bump the torsion bar suspension absorbs the bump but, in addition, the piston in the shock absorber 122 is compressed and gradually relaxes as the bump is passed. The shock absorber 122 serves to damp any bouncing in the torsion bar suspension which may occur after the bump is passed. At least the front and rear road wheels 116 also include a bump stop arrangement 123 which is simply a rod attached to the chassis of the vehicle 110 which is padded on its end. The bump stop 123 serves to limit the upward motion of the trailing road wheel arm 117 when the capacity of the torsion bar suspension to absorb a bump is exceeded, as best seen in FIG. 3. A track tensioner 121 is also shown in FIG. 7 behind the forward guide wheel 115 for adjusting the position thereof which in turn adjusts the track tension.

Figure 9:
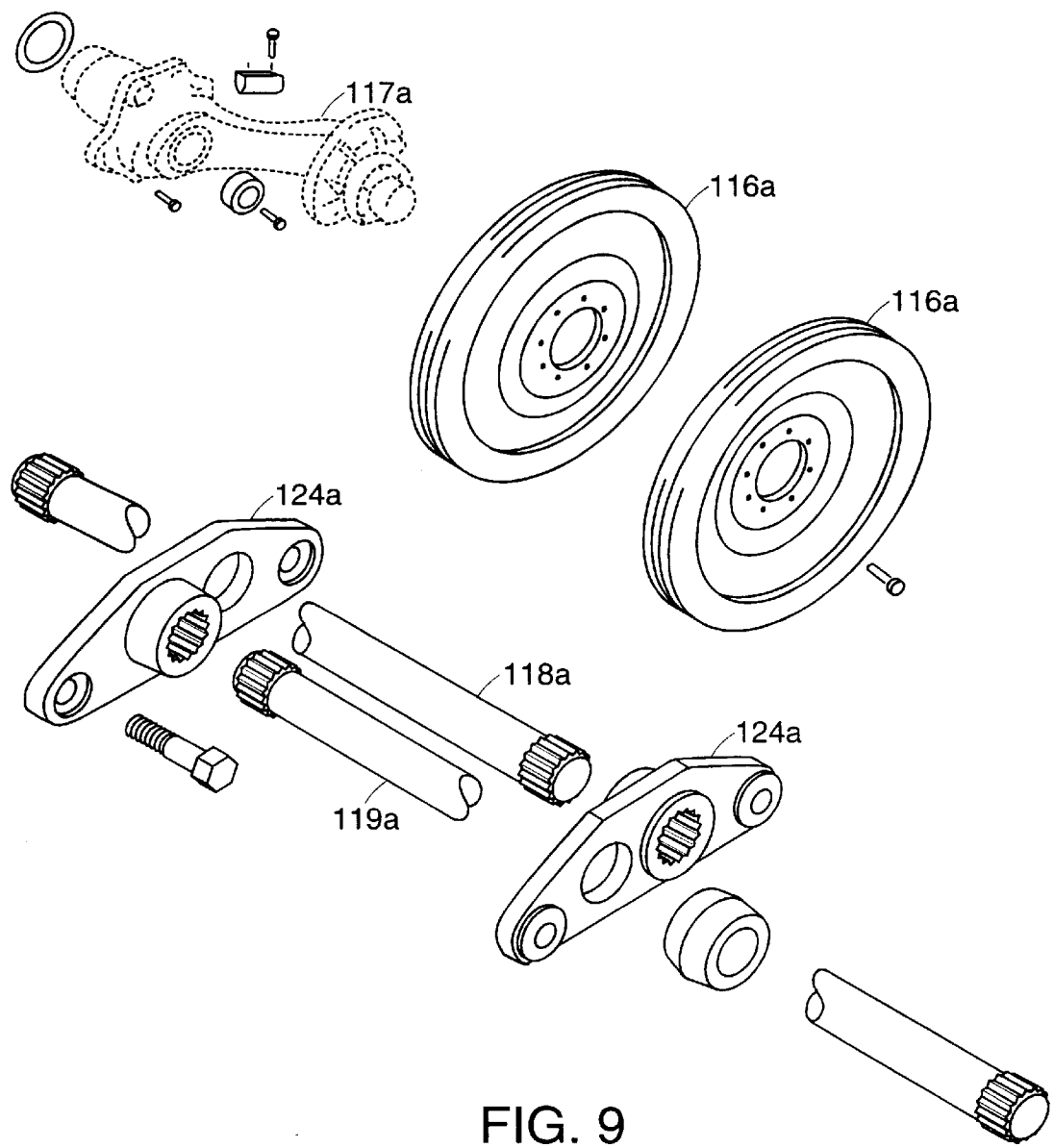
FIG. 9 is an exploded view of a conventional torsion bar suspension arrangement.

The torsion bar suspension arrangement is best described by first referring to the prior art arrangement illustrated in FIG. 9. As the principles of operation of the torsion bar suspension system are well known this arrangement will not be described in detail but it will be noted that torsion bars 118a, 119a on which trailing road wheel arms 117a are mounted are received by retainer plate 124a which is bolted to the chassis of the vehicle. In this arrangement the splined end of torsion bar 119a on one side of the vehicle and torsion bar 118a on the other side is simply received in an internal spline in a recess on the retainer plate 124a. It is also apparent that the trailing road wheel arms 117a extend downwardly at about 45° from the torsion bars 118a, 119a. Consequently, the wheels 116a are located far below the torsion bars 118a, 119a and so the vehicle is raised well above the ground.

In the present invention the torsion bar 118 is mounted at one end to retainer plate 124 and at the other end extends through the corresponding retainer plate 125 on the other side of the vehicle. Thereafter, the torsion bar 118 passes through the chassis of the vehicle and has trailing road wheel arm 117 attached to its end. As in the conventional arrangement described above with reference to FIG. 9, each end of the torsion bar is splined. The end of the torsion bar 118 which receives trailing road wheel arm 117 simply engages an internal spline in a recess on the arm 117. A bump encountered by road wheel 116 is transferred through trailing road wheel arm 117 to torsion bar 118 which tends to twist as a result of the bump, but twisting is resisted by the splined engagement of the torsion bar 118 with retainer plate 124. Thus, the torsion bar acts as a spring and reduces the transmission of the bump to the chassis of the vehicle 110.

Figure 10:
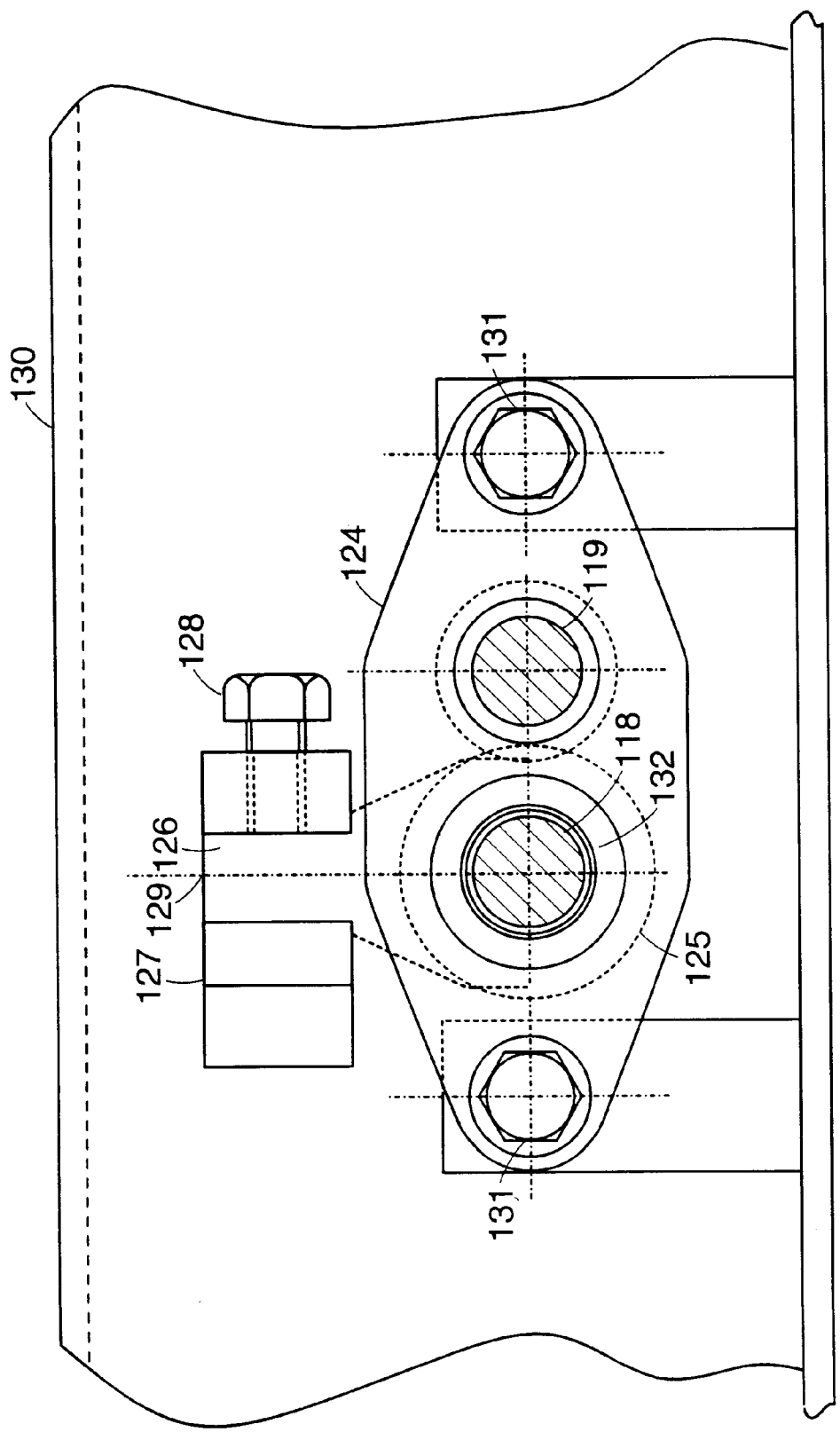
FIG. 10 is a side view of the torsion bar suspension arrangement used in the vehicle shown in FIG. 1.
Figure 11:
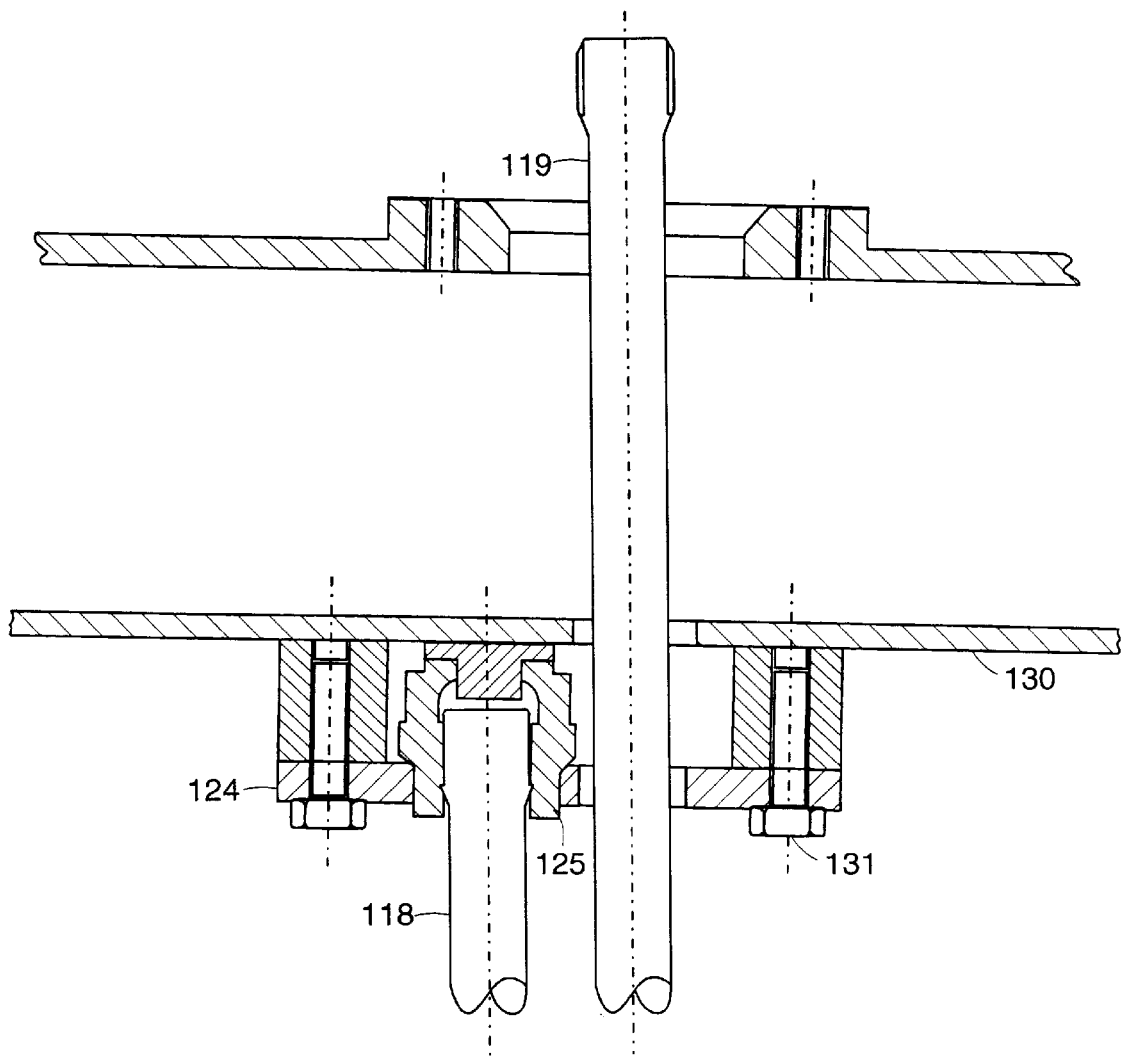
FIG. 11 is a cross-section viewed along line 6—6 of FIG. 10.
Figure 12:
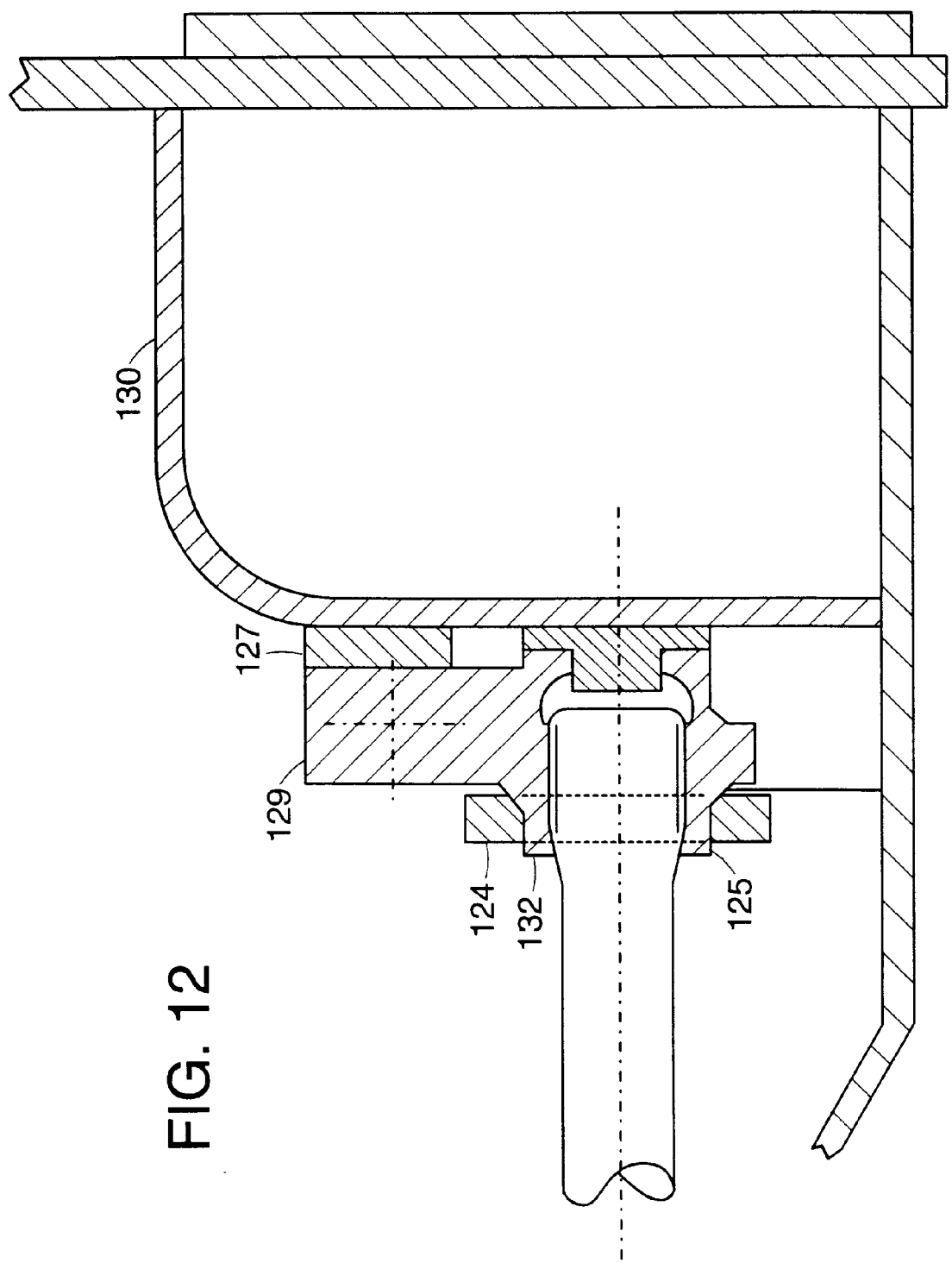
FIG. 12 is a cross-section viewed along line 7—7 of FIG. 10.

Referring to FIGS. 9, 10 and 11, it can be seen the torsion bar 118 is received in boss 125 which, as best seen in FIG. 7, is securely held in retainer plate 124 by way of the tight fit of the boss portion 132 in an orifice in the retainer plate 124. The retainer plate 124 is secured to but spaced apart from a bracket 130 attached to the chassis of the vehicle 110 by bolts 131. The boss 125 has an arm 126 positioned behind the retainer plate 124 which extends upwardly to be received in a channel 129 in keeper block 127 and is held therein by bolt 128. Referring now to FIG. 12 it can be seen that the keeper block 127 is welded to the curved bracket 130 which is attached to the chassis of the vehicle 110. As shown in the Figures the keeper block 127 is welded on the bracket 130 such that the channel 129 formed therein is orientated vertically. Boss 125 is in turn held in the vertical position and the torsion bar 118 extends outwardly therefrom in a horizontal orientation. If the keeper block 127 is welded onto the bracket 130 at an angle to the horizontal, the channel 129 will be orientated at an angle to the vertical. The boss 125, which is held in the channel 129 in the keeper block 127, will assume the same orientation as the keeper block thereby urging the torsion bar 118 received in the boss to rotate so that additional torsion is applied to the bar 118 with the result that the suspension holds the vehicle higher above the ground. Thus, by altering the orientation of keeper block 127 the height of the suspension is raised a little.

Figure 13:
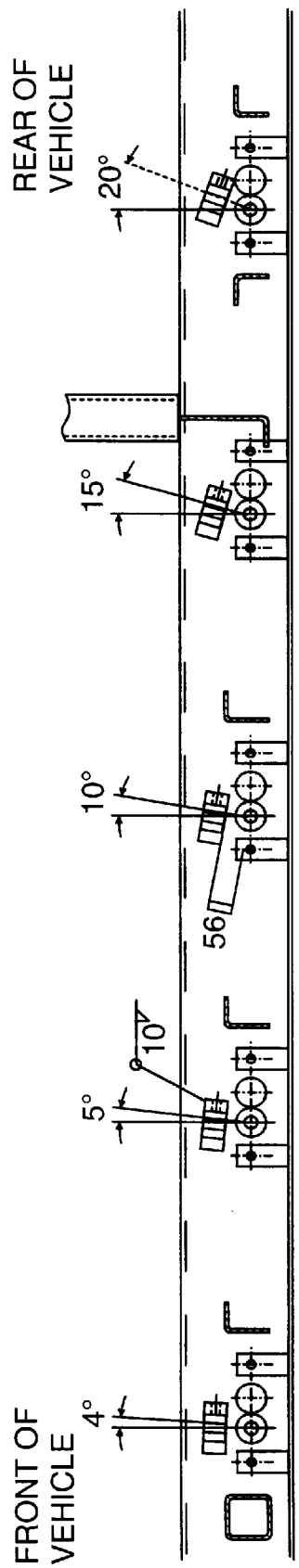
FIG. 13 is a schematic illustration of the suspension of the vehicle illustrated in FIG. 1.

As the weight over each of the wheels 116 varies, the orientation of the keeper block 127 must also be altered in order to keep the vehicle level. FIG. 13 is a schematic representation of the suspension system where the vehicle is to be suspended 300 millimeters above the ground. The front wheel furthest to the left requires the channel 129 in the keeper block 127 which receives arm 126 extending from the boss to be orientated at 50 from the vertical as very little weight is carried above the front wheel. Similarly, the second wheel from the left is orientated with the channel 129 at 5° from the vertical, the third wheel with the channel 129 at 10° from the vertical, the fourth wheel with it at 15° from the vertical and the rear wheel, which carries most of the weight of the engine, has the channel 129 orientated at 20° from the vertical. Preferably wheels are oriented with the channel at less than 25° with respect to the vertical. But at least less then 40°. If the weight carried by each of the wheels were equal the vehicle would be low at the front and high at the back but the extra weight carried at the back bears the vehicle down so that it is level. If the ground clearance is to be raised above 300 millimeters The keeper block on each of the wheels will be orientated at a slightly greater angle, or if the vehicle is to be lowered it will be orientated at a lesser angle than that shown in FIG. 13.

The vehicle 10 includes a passenger cabin 21 in which personnel are carried and an engine bay 22 in which a diesel engine 32 and associated hydraulics constituting said drive means are housed. The engine bay 22 is located to the rear of the vehicle and is fully enclosed. The cabin 21 is separated from the engine bay 22 by a steel bulkhead 43 to the rear of the mid-point of the vehicle. Thus, the steel walls 44, 45 and roof 46 and floor of the vehicle enclose the engine bay 22 so that the components contained therein will be protected from accidental impact damage while the vehicle traverses rough terrain. An air receiver 30 is provided in the wall 44 to introduce compressed air to start the diesel engine and to operate the safety shut-down system. A radiator 36 is provided at the rear of the vehicle which is otherwise enclosed by a rear wall 48. Exhaust gases from the engine 32 are directed to exhaust scrubber 33 and thence through exhaust outlet 18 which extends horizontally from scrubber 33 and then vertically downwards to an opening in the bottom of the vehicle. Access to the engine bay 22 is through door 52 which folds back to reveal the engine and hydraulic pumps. Access hatches 106 and 107 for providing ventilating air to the engine bay are located in the engine bay roof and in wall 44. Access hatches (not seen) are also provided in wall 45.

The cabin 21 is enclosed by bulkhead 43 at its rear, by walls 44, 45 at either side and by roof 46. Towards the front of the vehicle a partition 49 is provided to separate a driver's compartment 20 from the cabin 21. A passageway 50 located beside the driver's compartment 20 provides access for personnel to the cabin 21 which extends substantially across the width of the vehicle behind the driver's compartment 20. Seating 29 is provided in the cabin 21 and also alongside the passageway 50 so that up to 12 passengers can be carried in the vehicle.

Entry to the passageway 50 is through doorway 23 at the front of the vehicle beside driver's compartment 20. A step 24 is located in front of doorway 23 and a door 51 (shown in the open position) is hingedly attached to front wall 60

(which is low enough for a driver seated in the driver's compartment to see over it) for safety reasons. The vehicle 10 cannot operate if the door is open (a switch in the door applies the park brake 67) so that a person still entering the vehicle cannot be run over if the vehicle accidentally starts to move.

Lights 25 are provided to each side of the vehicle at front and rear to light the passage in a mine roadway and lateral lights 26 are also provided to assist manoeuvring. Red lenses are positioned by compressed air over the rear lights when forward gear is selected. When reverse gear is selected, red lenses are retracted from the rear lights and are positioned by compressed air over the front lights to visually indicate the direction the vehicle will move. According to another embodiment the red lenses are replaced by lamps which consist of builtin red lights behind white globes. They are activated by a relay switch which is thrown by an air cylinder pressurised when reverse gear is selected. For safety reasons a fire extinguisher 27 is attached to the front of the vehicle within reach of the driver.

The power required to drive the vehicle 10 is provided by a conventional diesel engine 32 located in engine bay 22. The diesel engine 32 is a 3.3 liter 6 cylinder diesel engine. The engine and its exhaust manifold is water cooled, the cooling being provided by radiator 36. The engine 32 has a power output of 112 kW at 2200 rpm and maximum torque of 579 Nm at 1200 rpm. The engine 32 drives a dual hydraulic pump 34 which in turn drive two hydraulic motor 35, one of which is associated with each of the tracks. Each hydraulic motor 35 drives sprocket 13 through a speed reducing torque hub 53.

Figure 5:
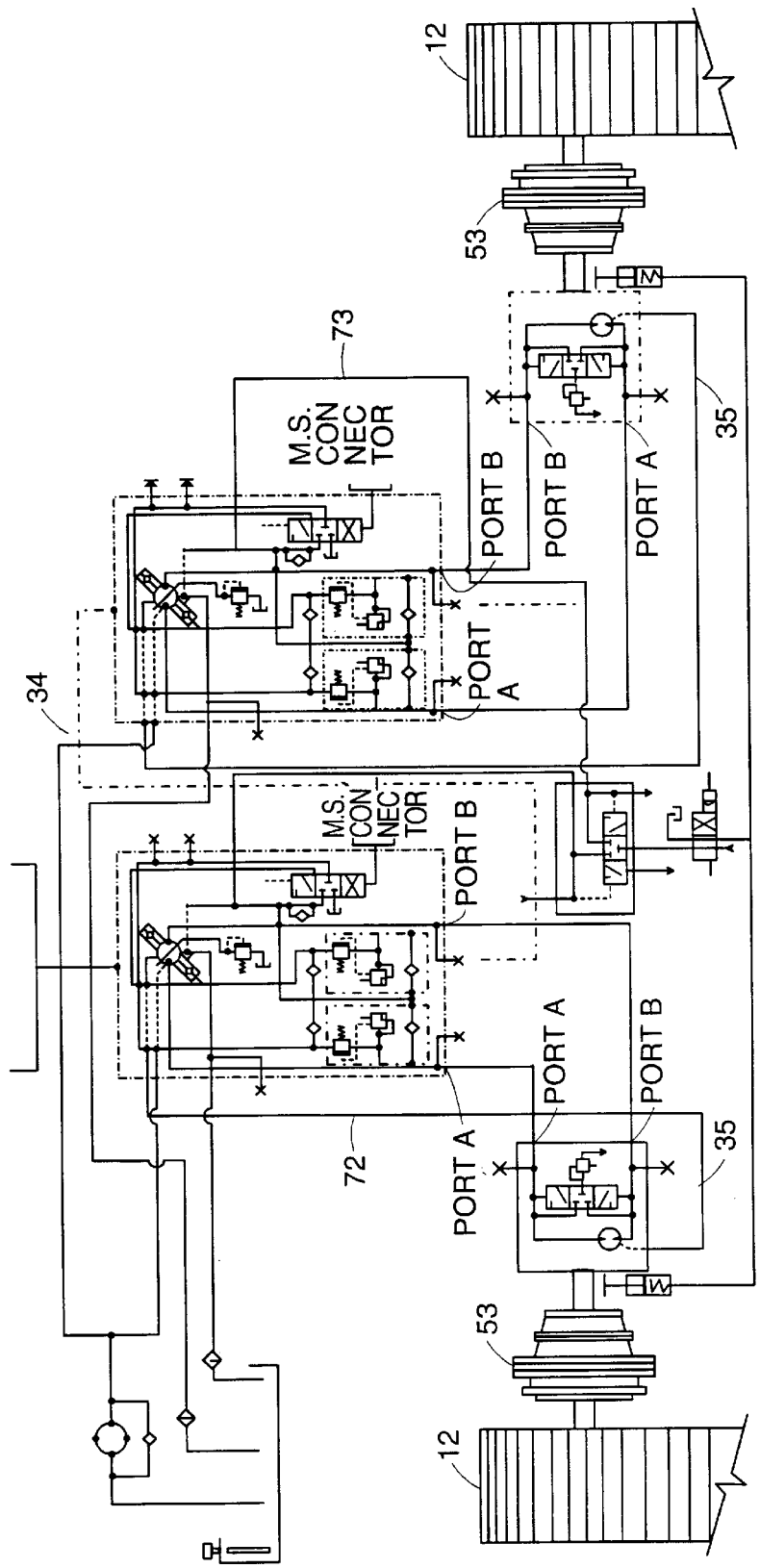
FIG. 5 is a schematic diagram of the hydraulic circuitry in the vehicle.

An example of a hydraulic circuit diagram for the vehicle 10 is shown in FIG. 5. A commentary on the hydraulic circuit is not given in any detail as it is within the understanding of a hydraulics engineer to provide suitable hydraulics to make the vehicle work depending on the particular parameters used. The hydraulic circuit diagram is therefore only provided to give an example of one hydraulic circuit which would enable the vehicle to be operated.

It will be appreciated that the hydraulic pump 34 is a dual unit and has a portion 72 which drives the left hand track and a portion 73 which drives the right hand track, Each of the portions 72, 73 receive a signal from the electrical displacement controls 55, 59 (refer to FIG. 6) in response to which an electro-proportional servo controller acts to alter the displacement of that portion of the hydraulic motor directly in proportion to the applied electrical input signal. The alteration to the displacement of the portion 72, 73 of the hydraulic motor varies the oil flow to the hydraulic motor 35 associated with each of the tracks 12 and so alters the speed of the motor 35. This in turn alters the speed at which the sprocket 13 is driven and so alters the speed of the track 12 and hence the vehicle 10.

A fail safe brake 67 is located between the hydraulic motor 35 and the torque hub 53 for each track 12. The fail safe brake 67 is a spring operated wet disk brake held open by the hydraulic charge pressure present in all main working lines whilst the engine is running. However, the failure of any major component or line failure or the opening of the front door 23 or the activation of the driver's park brake 83 or the activation of either of two emergency stop buttons mounted externally at each rear corner of the vehicle will result in an immediate decrease in charge pressure which will cause the brake springs to automatically apply the brake.

The engine 32 and hydraulic pump 34 as well as ancillary equipment such as the exhaust scrubber 33, AC alternator 66 and radiator 36, are mounted on frame 70 which is bolted to the body of the vehicle 10 at four mounting points. These components form a single module which can be lifted out of the engine bay 22 as a whole. A rubber block is interspersed between the frame 70 and body of the vehicle 10 so that engine vibration is isolated from the rest of the vehicle, with the result that the vibrations are not transmitted to the cabin 21. This makes the ride more comfortable. In the event of a breakdown it will be appreciated that the module can be lifted out of the engine bay 22 by undoing the four bolts that secure the frame 70 to the vehicle 10. The module can then be lifted out and replaced by another module. Once the replacement module is connected in place the vehicle can once again be used while the unserviceable component is repaired.

In order to save space, a fuel tank 28 for the diesel engine is located beside the cabin 21 above the track 12 and extends along the right wall 45 of the vehicle. A make-up water tank 31 for supplying water to the exhaust scrubber is mounted behind the fuel tank. The air receiver 30 is similarly located in the left wall 44 and the hydraulic oil tank 30 is located behind the air receiver 30 beside the engine. Appropriate connections, such as an oil line extending from engine oil inlet 61 to the engine 32 and air line 68 extending from air cleaner 64 to the engine 32, are made between these components and the module. These connections are adapted for easy disconnection and reconnection to facilitate replacement of the module.

It will be noted that the module comprising diesel engine 32 mounted to the front right of the module with DC and AC alternators 66 on the front edge of the frame 70. To the left of the module, space is provided for hydraulic lines and air lines and to allow access to the engine. The air cleaner 64 is illustrated mounted to the left hand side of the module but is more conveniently mounted inside the side wall 44 of the vehicle 10 between the hydraulic tank 19 and the air receiver 30. Radiator 36 is mounted to the rear right hand side of the module and hydraulic pump 34 (which consists of two portions each of which drives a hydraulic motor 35 associated with the left and right hand tracks) is mounted to the rear of the module beside the radiator.

Other electrical components of the vehicle such as flame proof AC and DC alternators 66 are mounted on the engine module frame 70 near bulkhead 43 and flame proof electrical junction boxes 62 and 63 are located in the walls 44, 45 of the vehicle although regulator box 65 is located in the portion of the vehicle forward of cabin 21 and on the opposite side of the vehicle to the drivers compartment 20.

It will be noted the diesel engine 32 includes an exhaust scrubber 33 which comprises a tank having a set water level into which an exhaust inlet 71 extends. The inlet 71 first runs along the top of the scrubber and then extends vertically downwards so that its end is below the water level in the tank, whereupon exhaust gases emanating from inlet 71 pass through the water as they leave the end of inlet 71. The exhaust gases then rise to exit the scrubber via exhaust outlet 18 which is located near the top of the scrubber and extends initially towards the rear of the vehicle and then downwardly to an opening in the bottom of the vehicle. The water in the scrubber extinguishes any sparks or flame in the exhaust gases and cools the exhaust gases to prevent potential ignition of methane gas which may be present in an underground coal mine. Water is supplied to the exhaust scrubber by make-up water tank 28 and is forced from tank 28 by compressed air pressure fed into that tank. When the scrubber water level is at the correct running height of 265 millimeters a float in the tank will rise causing a valve in the make-up tank to close, thereby stopping further water flow into the scrubber 33. As water is used in the scrubber 33 the water level will fall and the valve in the make-up tank 28 will re-open to maintain the correct water level. In the event that there is insufficient water to re-fill the scrubber 33 a safety system automatically disables the engine.

Figure 4:
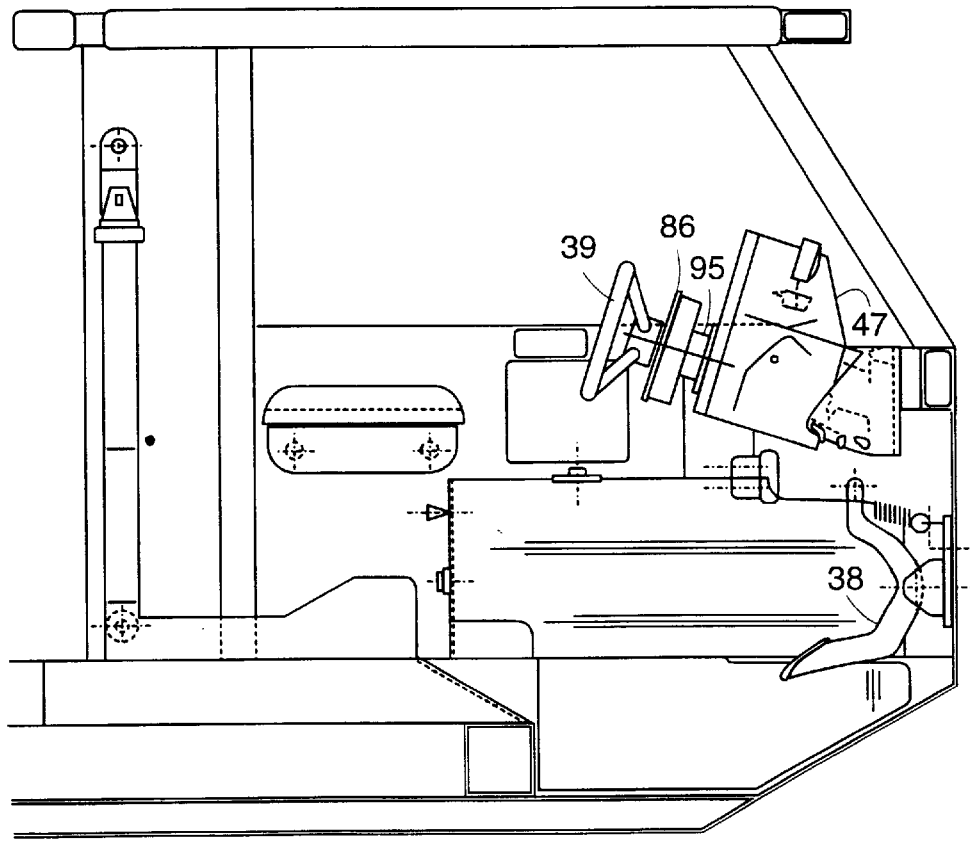

The drivers compartment 20 will now be described in more detail with reference to FIGS. 3 and 4. The compartment is configured like the driver's compartment in an automobile and has a brake pedal 37, a throttle pedal 38 and steering wheel 39 as well as the control lever 40 for selecting forward, neutral or reverse motive power. The transfer of motive power and steering from the controls to the hydraulic tracks is achieved by electronic control system which is designed to give driving the vehicle an "automotive feel".

The drivers compartment 20 also includes various gauges such as engine oil pressure gauge 74, air start pressure gauge 75, engine rpm indicator 76, speedometer 77, fail safe brake pressure gauge 78, cooling water temperature gauge 79 and hydraulic oil temperature gauge 80. The vehicle is started with a key start 81 which opens a run/stop valve and then by depressing an air start button 82. The air start system will be overridden it there is low engine oil, the engine is overheated, the water level in the engine scrubber 33 is low, the machine is not in neutral, the park brake is not applied or the exhaust gas temperature exceeds statutory limits. The park brake control 83 is located to the left hand side of the cabin just above the park brake reset control 84. A horn button 85 is located on the right hand side of the compartment. Just above the horn button 85 on the console 47 is an emergency stop button 42 which can be used to manually activate the fail safe brake 67 in an emergency situation. It will be noted that the steering wheel 39 has a shaft (which is surrounded by base 95 and so is not seen in FIG. 4) extending therefrom into console 47 and a self-centering mechanism 86 is mounted on the shaft.

The self-centering mechanism 86 will now be described with reference to FIGS. 14 to 16, and it will be appreciated that, while the apparatus used in the vehicle illustrated is to centre the steering wheel it is not necessary that the steering arrangement described herein be used in that application or that it be used to centre a wheel.

The self-centering mechanism 286 is housed in a casing 294 mounted on shaft 287. The shaft extends through the casing 294 and has steering wheel 239 mounted on its end. As in a conventional steering arrangement, turning the wheel 239 causes the shaft 287 to rotate and rotation of the shaft 287 controls the steering of the vehicle as described below with reference to FIG. 6. In order to provide an "automotive feel" to the steering the self-centering mechanism 286 is mounted in shaft 287 to provide resistance to turning the wheel and to return the wheel, once released, to its centered position.

The steering wheel 239 includes a central bore at the intersection of its four "arms" (not seen) through which shaft 287 extends. Shaft 287 has a bolt 289 located within which, together with the nut 290 which bears down on the washer 291 on top of the shaft, secures the steering wheel 239 to the shaft 287. A hub 288 is mounted on the steering wheel 239 to disguise the connection. The hub 288 includes a cap plate 292 which is screwed to the top of the hub 288 in a fashion which allows it to be removed to allow access to nut 290 so that nut 290 can be unscrewed and the steering wheel removed, The shaft 287 extends through an opening in the top of casing 294, which is screwed to the remainder of the casing by screws 295. Hub 288 is not attached to casing 294 to allow rotation of the steering wheel 239.

Figure 14:
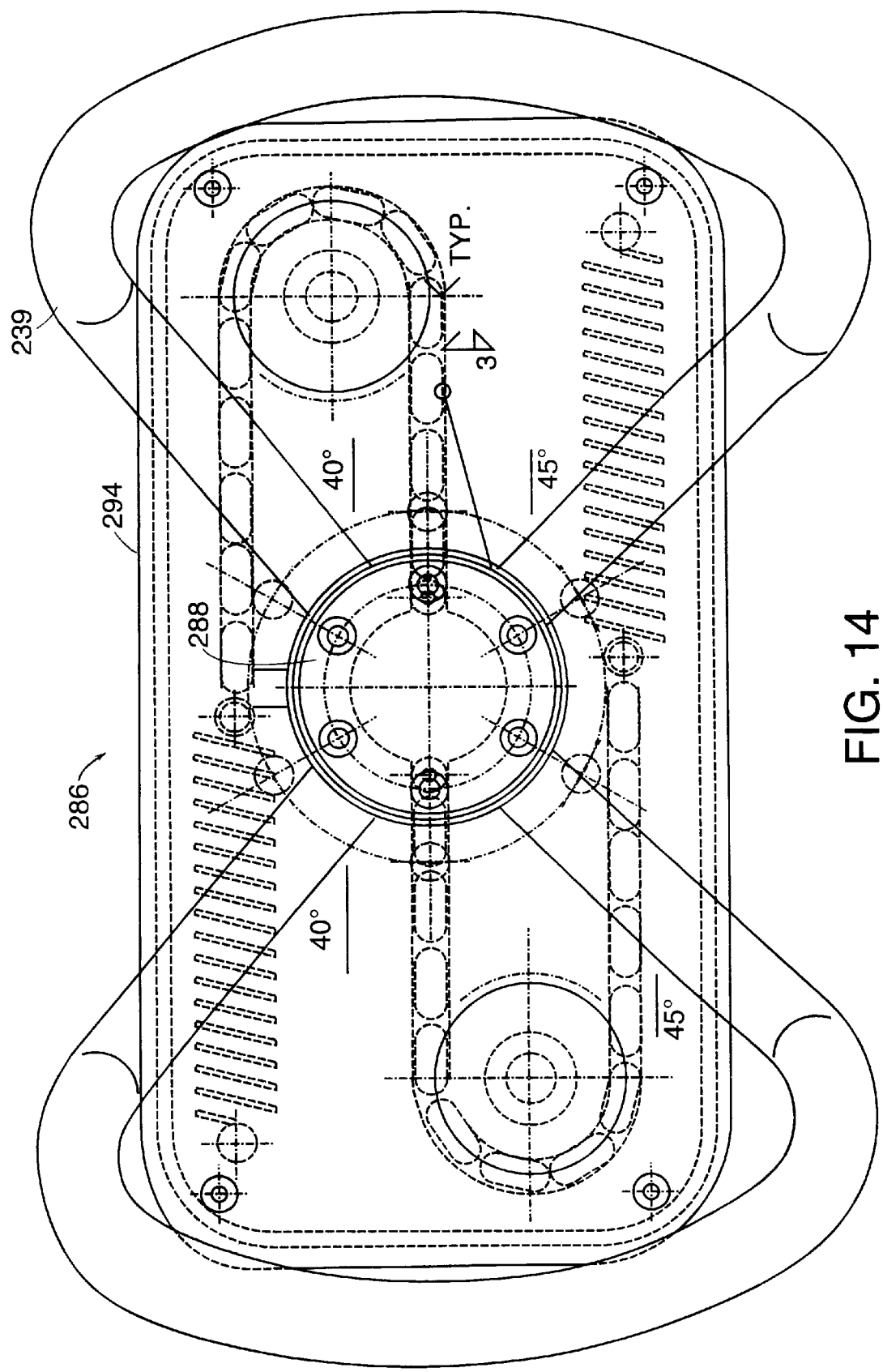
FIG. 14 is a front view of the steering arrangement seen in FIGS. 3 and 4.
Figure 15:
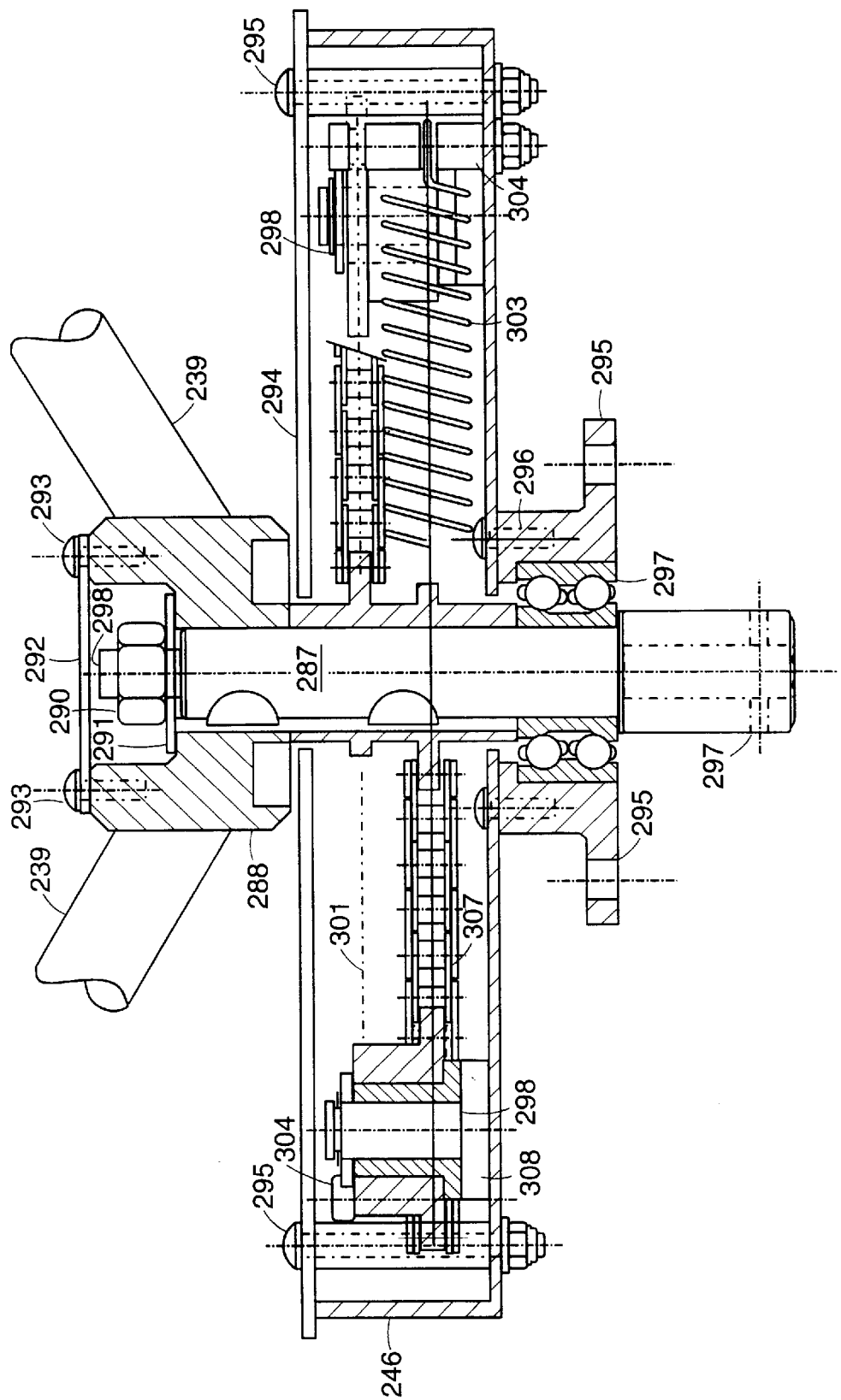
FIG. 15 is a cross-section through the steering arrangement shown in FIG. 14.
Figure 16:
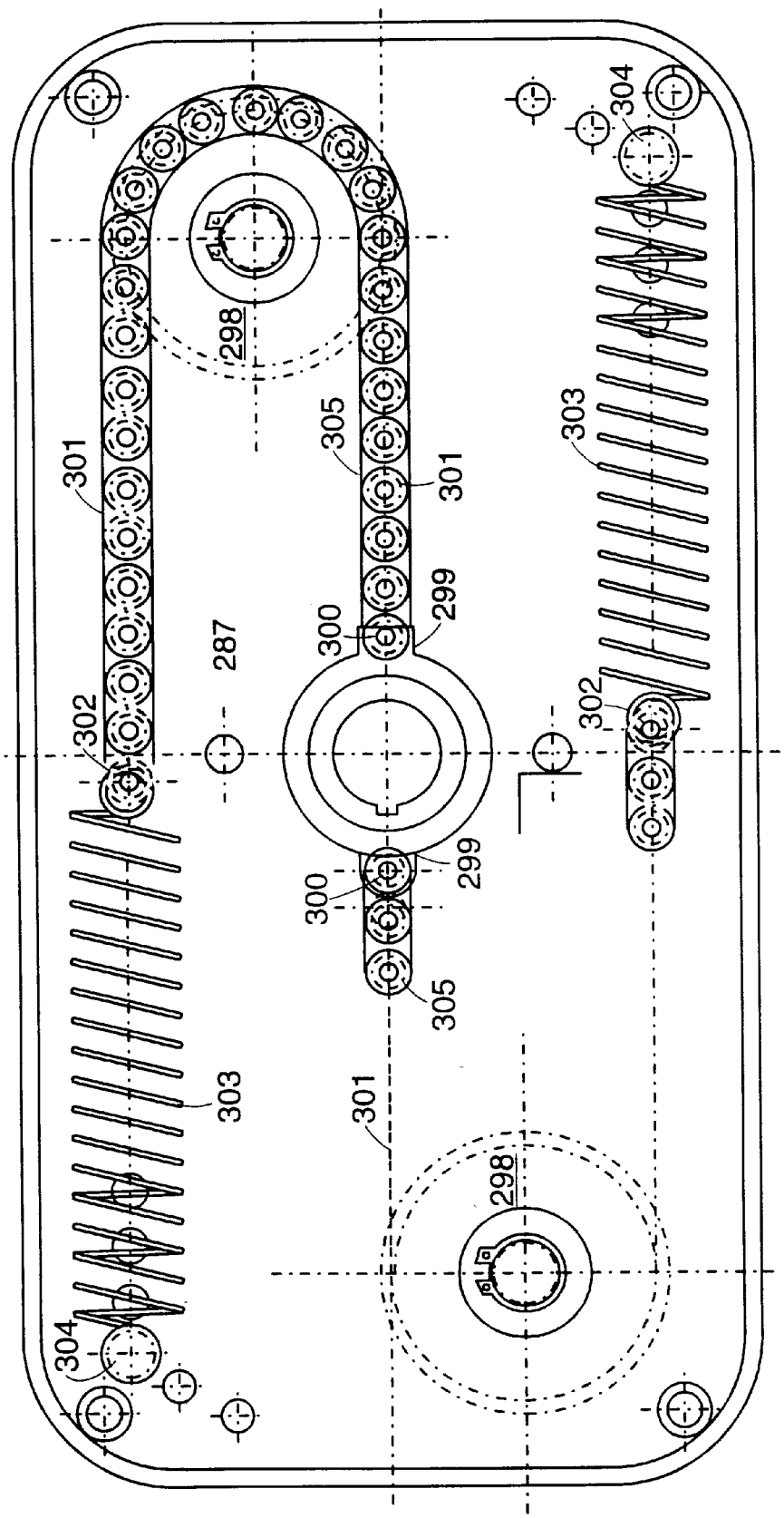
FIG. 16 is a similar view to FIG. 14 with the console removed.

FIG. 16 is a similar view of the steering arrangement to that in FIG. 14 with the exception that the lid of the casing 294 has been removed and the steering wheel has been removed to reveal the selfcentering mechanism inside the casing 294.

The shaft 287 extends through the casing 294 and into the drivers console 247. The casing 294 is screwed with screws 296 to base 295 which is mounted on the driver's console 247. The bearings 297 inside the base 295 ensure that the shaft 287 can rotate freely. Rotation of the shaft is measured inside the drivers console by a potentiometer (not shown) and the electrical signal generated by rotation of the shaft steers the vehicle as described herein below with reference to FIG. 6.

The operation of the centering assembly is best seen in FIG. 16 but is also shown in hidden detail in FIG. 14. The centering assembly has a pair of pulleys 298 mounted one to each side of the shaft 287 with one pulley being located to the rear of the shaft 287 and the other forward of the shaft 287 but with the forwardmost and rearmost surfaces respectively of the pulley lying on the longitudinal axis of the casing 294. The longitudinal axis of the casing 294 also extends through the centre of shaft 287. Each of the pulleys 98 includes a base 308 through which screw 295 protrudes in order to secure the pulley on the bottom of the casing 294. Thus, the pulleys occupy the forward left and rear right hand corners of the casing 294 and the shaft 287 is centrally positioned in the casing. In the rear left corner and front right corner a post 304 is screwed into the bottom of the casing 294. Each post is aligned longitudinally from the surface of the pulley furthest from the longitudinal axis of the casing 294.

The shaft 287 includes a tab 299 on each side, spaced at 180° from each other, and these are disposed directly along the longitudinal axis of the casing 294 when the steering wheel is centered. Each of the tabs 299 engages the end chain link 300 on a chain 301. The chain 301 extends along the longitudinal axis towards the left and the right respectively of the casing 294. The chain 301 in each case is disposed around pulley 298 and has its direction changed by 180° by the pulley and is laterally displaced forward or to the rear of the shaft 287. The chain 301 once again extends longitudinally from the surface of the pulley furthest from the longitudinal axis of the casing 294 towards post 304 in each case. The end chain link 302 is secured to the end of a coil spring 303 which is anchored to post 304. The coil spring 303 extends longitudinally from the end of the chain 301 to the post 304.

In operation, the steering wheel 239 is fixedly mounted to the shaft 287 as described above, so turning the steering wheel will rotate the shaft 287. By way of example, rotating the wheel to the left in order to turn the vehicle to the left will turn the shaft in the anti-clockwise direction. As a consequence of this rotation the tabs 299 will be displaced by a predetermined amount, determined by the amount of rotation applied to the steering wheel, in the anti-clockwise direction. The end chain link 300 which is attached to tab 299 will tend to pivot about its connection with tab 299 but will also be displaced to some degree in the anti-clockwise direction. In order for this movement of the end chain link 300 to occur it will be appreciated that coil spring 302 will have to extend, which in turn will allow end chain link 302 no be displaced longitudinally towards pulley 298 which in each case will rotate in the clockwise direction to increase the length of chain 301 in the portion of the chain 305. The chain portion 305 can then be displaced laterally by movement of the shaft. Thus, lateral movement of end chain link 300 and the portion of the chain 305 is allowed by extension of the coil spring 303, but it will be appreciated that the coil spring 303 desires to return to the unextended configuration and so urges the reverse movements to those just described to occur. Thus, a person turning the steering wheel 239 feels resistance to the turning movement and, once the steering force is released, the reverse movements to those which occur when the wheel is turned will occur due to the contraction of the coil spring, and the steering wheel will return to the centered position.

Figure 6:
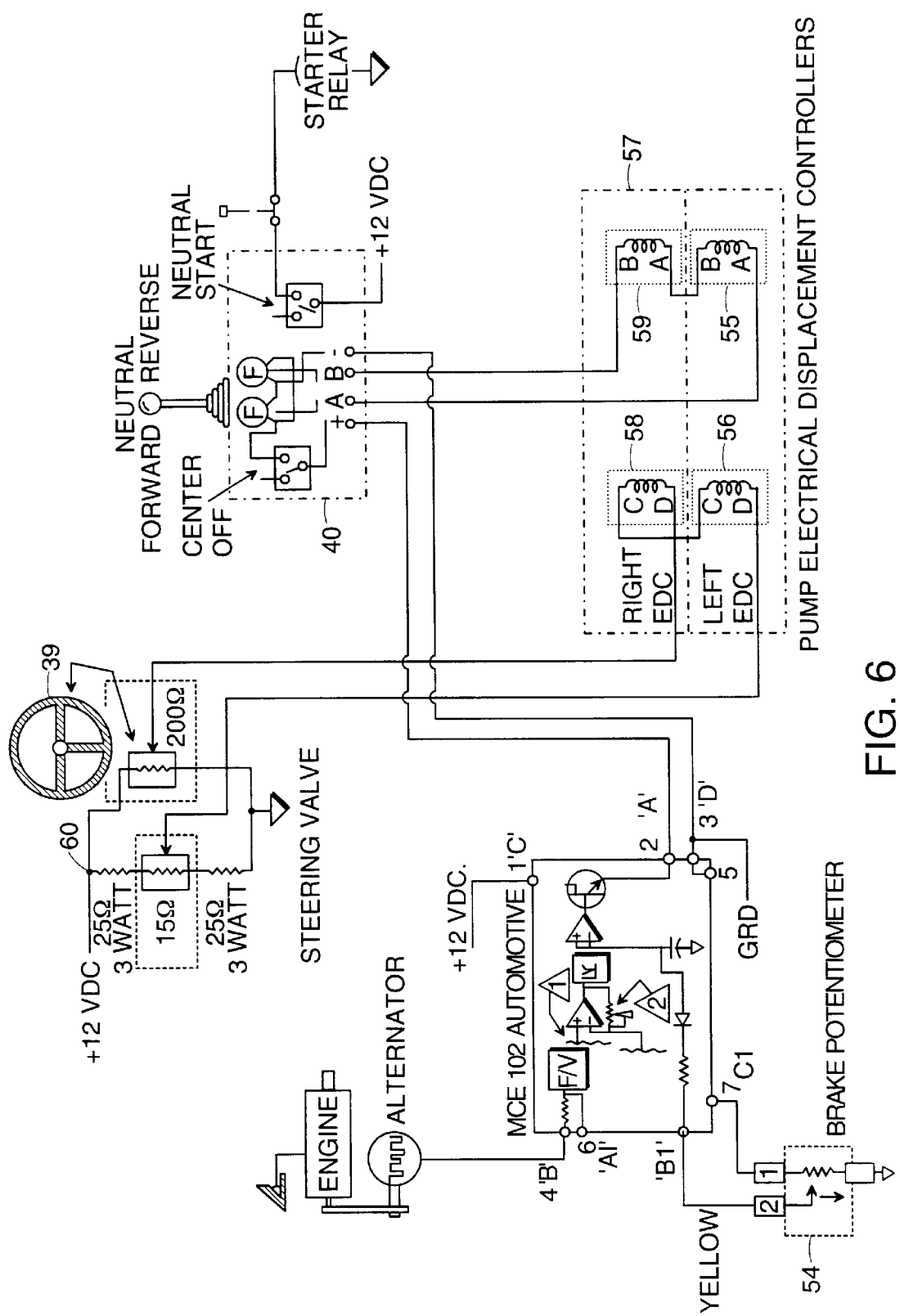
FIG. 6 is an electrical circuit diagram for the vehicle.

FIG. 6 is a block diagram illustrating the electrical circuit used in the vehicle 10. The propel circuits include a forward/neutral/reverse selector 40 and a brake potentiometer 54 linked to throttle pedal 38 and brake pedal 37 shown in FIG. 3. In this arrangement the output voltage selected by moving the selector 40 into the forward position is limited by the brake potentiometer, and so as the braking is progressively reduced by depressing the throttle pedal 38 an increasingly greater drive to the tracks is provided. Releasing the throttle pedal 38 and depressing the brake pedal 37 once again increases the braking. This contributes to the "automotive feel" of the vehicle by making the speed of the vehicle controllable by a throttle pedal and brake pedal which control the brake potentiometer 54 and through it the power applied to the tracks. The electrical signal generated as described above is transferred by way of left and right pump electrical displacement controllers 55, 57 (EDC's) to the portion 72, 73 of hydraulic pump 34 associated with the left or right track which drives the track at a speed proportional to the signal in the manner described previously.

Steering the vehicle 10 is achieved through the use of dual coil EDC's. The left propel coil 55 and left steer coil 56 are the two control coils to the hydraulic pump 34 which drives the left track 12 of the vehicle. When there is no current in the steering circuit 59, the propel signal is the only signal and the track will be driven at a certain speed. However, for example, if by turning the steering wheel 39 to the right a steering current is added to the propel signal in the left track a greater electrical signal will be received by the left portion 72 of the hydraulic pump 34. The displacement of the portion 72 will increase in response to the greater signal and more hydraulic oil will be pumped to the left hydraulic motor 35. The left motor 35 will be driven taster with the result that the left track will be driven faster. The right track will have the opposite adjustment made to it through right steer coil 58 so the left track will now be driven faster than the right track and the vehicle will turn to the right.

Control of the steering circuit is by way of steering wheel 39, the rotation of which is measured by a potentiometer on the shaft on which the steering wheel is mounted. When the wheel is centered the potentiometer is centered, hence the bridge circuit 60 is balanced and there is no current through the steering circuit. When the wheel is turned the wiper of the potentiometer is offset and the bridge circuit 60 is offset so the coils 55, 57 will add current to the propel current on one side of the vehicle and subtract current from the other (dependent on which way the wheel is turned) to steer the vehicle in the direction the wheel is turned. The steering wheel is 39 is self-centering, as described above, and self-centering of the wheel will be detected by the potentiometer. Thus, the vehicle will straighten its direction of travel to the new heading set by turning the wheel once the steering wheel is released by the driver.

According to another embodiment of the present invention each track is independently hydraulically driven for the driver to steer the vehicle by selective application of power to each track.

I claim:

1. A vehicle for underground mine shafts comprising a body having a cabin located in a front section of the vehicle with an entry to the cabin located at the front of the vehicle, a door at the entry, a sensor for sensing when the door is open and control circuitry which is connected to the sensor and vehicle brakes to activate the vehicle brakes when the sensor senses that the door is open, a pair of tracks on either side of the cabin, a driving means for driving the tracks, a steering means for steering the body, a suspension system including a torsion bar suspension arrangement which permits torsion bars of the vehicle to be located just above the level of track wheels of the vehicle, the torsion bar suspension arrangement having a torsion bar receiving means for applying torsion to the torsion bars and a torsion adjusting means including engagement means being capable of orientation at a predetermined angle with respect to a vertical axis for engaging the torsion bar receiving means and a member having a channel formed therein for receipt of the engagement means, wherein the torsion adjusting means is arranged to urge the torsion bar receiving means to a predetermined orientation.

2. A vehicle as claimed in claim 1 wherein the engagement means includes a component having one end with a through hole, which one end is adapted to be located in the channel whereby a bolt of the adjusting means secures the engagement means to the member.

3. A vehicle as claimed in claim 1 or 2 wherein the torsion bar receiving means comprises, a first end which is arranged to be connected to the engagement means and a second end arranged to receive a torsion bar.

4. A vehicle as claimed in claim 3 wherein the torsion bar receiving means comprises an internally splined boss at the second end with an arm extending therefrom having an end forming the first end which is received by the engagement means.

5. A vehicle as claimed in claim 1 whereas the torsion adjusting means member is arranged to be connected to the chassis, of the vehicle in a predetermined position in which the channel is orientated at said predetermined angle to the vertical axis.

6. A vehicle as claimed in claim 4 wherein the internally splined boss is retained in an orifice in a retainer plate of the torsion adjusting means and can rotate so that the arm can be received in the channel.

7. A vehicle as claimed in claim 3 wherein the suspension system comprises a plurality of torsion adjustment means and associated torsion bars and the torsion applied to each torsion bar is determined by on associated torsion bar receiving means of respective torsion bars.

8. A vehicle as claimed in claim 7 wherein trailing road wheel arms are disposed horizontally and extend substantially transversely from the associated torsion bar.

9. A vehicle as claimed in claim 2 wherein the torsion adjustment means member is movable to permit adjustment of the torsion applied to a torsion bar while the vehicle is in the field.

10. A vehicle as claimed in claim 8 wherein road wheel arms interconnecting wheels and torsion bars are oriented at angles less then 25° from the associated torsion bars.

11. A vehicle as claimed in claim 1 wherein the steering means comprises a shaft, a steering wheel mounted on the shaft for imparting rotational motion to said shaft, and a biasing means for biasing the shaft to a predetermined position.

12. A vehicle as claimed in claim 11 wherein the biasing means is coupled to the shaft at more than one point.

13. A vehicle as claimed in claim 11 wherein the biasing means acts to centre the shaft.

14. A vehicle as claimed in claim 13 wherein the biasing means comprises a spring.

15. A vehicle as claimed in claim 14 wherein the biasing means comprises a plurality of springs each spring being connected to the shaft by substantially inextensible link means.

16. A vehicle as claimed in claim 15 wherein each link means extends around one or more pulleys.

17. A vehicle as claimed in claim 15 comprising means for measuring rotation of the shaft and means for steering the vehicle in proportion to the rotation of the shaft.

18. A vehicle as claimed in claim 1 wherein the steering means affects steering by selective application of power to the tracks.

19. A vehicle as claimed in claim 1 wherein the body comprises a module which supports a diesel engine, its cooling system and a hydraulic pump, the module being removable to fix any components thereof.

20. A vehicle as claimed in claim 19 wherein the body comprises a rubber block located between the module and the rest of the body.

* * * * *